(12) United States Patent
Orbay

(10) Patent No.: US 11,689,087 B2
(45) Date of Patent: Jun. 27, 2023

(54) PERMANENT MAGNET MOTOR WITH FIELD WEAKENING ARRANGEMENT

(71) Applicant: Volvo Car Corporation, Gothenburg (SE)

(72) Inventor: Raik Orbay, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 101 days.

(21) Appl. No.: 17/330,644

(22) Filed: May 26, 2021

(65) Prior Publication Data

US 2021/0376705 A1 Dec. 2, 2021

(30) Foreign Application Priority Data

May 27, 2020 (EP) .................................... 20176838

(51) Int. Cl.
*H02K 21/02* (2006.01)
*H02K 1/276* (2022.01)
*H02K 21/24* (2006.01)
*H02K 21/14* (2006.01)

(52) U.S. Cl.
CPC ......... *H02K 21/028* (2013.01); *H02K 1/2766* (2013.01); *H02K 21/021* (2013.01); *H02K 21/14* (2013.01); *H02K 21/24* (2013.01)

(58) Field of Classification Search
CPC ....... H02K 21/028; H02K 1/2766; H02K 1/21
See application file for complete search history.

(56) References Cited

U.S. PATENT DOCUMENTS

| 6,194,802 B1* | 2/2001 | Rao | H02K 21/24 310/191 |
| 11,264,875 B2* | 3/2022 | Murgoci | H02K 21/025 |
| 11,322,996 B2* | 5/2022 | Mikami | H02K 1/2746 |

(Continued)

FOREIGN PATENT DOCUMENTS

| CN | 106664001 A | 5/2017 | |
| DE | 102014212872 A1 * | 1/2016 | H02K 1/2773 |

(Continued)

OTHER PUBLICATIONS

Extended EP Search Report for EP Application No. 20176838.9 dated Nov. 6, 2020, 5 pages.

*Primary Examiner* — Ahmed Elnakib
*Assistant Examiner* — Masoud Vaziri
(74) *Attorney, Agent, or Firm* — Amin, Turocy & Watson, LLP

(57) ABSTRACT

The invention relates to a permanent magnet motor, comprising: a stator configured for generating a time-varying magnetic field; a rotor, arranged inside of the stator, comprising at least one permanent magnet providing a constant magnetic field; the permanent magnet being made of a flexible material; the stator being configured for rotating the rotor by taking along the constant magnetic field of the rotor with the time-varying magnetic field of the stator; the rotor comprising a field weakening mechanical arrangement configured for weakening a flux of the permanent magnet motor; the field weakening mechanical arrangement supporting the permanent magnet and comprising a recess configured for allowing the permanent magnet to be deformed by a centrifugal force provided by the rotation of the rotor.

20 Claims, 4 Drawing Sheets

(56) References Cited

U.S. PATENT DOCUMENTS

| | | | | |
|---|---|---|---|---|
| 2001/0048261 A1* | 12/2001 | Kojima | ............... | H02K 3/30 |
| | | | | 310/43 |
| 2005/0184609 A1* | 8/2005 | Chen | ................ | F16C 32/041 |
| | | | | 310/90.5 |
| 2006/0158053 A1* | 7/2006 | Aschoff | ............... | H02K 1/30 |
| | | | | 310/91 |
| 2009/0146521 A1* | 6/2009 | Maki-Ontto | ........ | H02K 1/276 |
| | | | | 310/156.53 |
| 2013/0270956 A1* | 10/2013 | Yamaguchi | ........ | H02K 15/03 |
| | | | | 29/598 |
| 2013/0313936 A1* | 11/2013 | Shibata | ............ | H02K 1/2746 |
| | | | | 310/156.43 |
| 2014/0117785 A1* | 5/2014 | Furukawa | ......... | H02K 7/1876 |
| | | | | 310/15 |
| 2014/0368095 A1* | 12/2014 | Kamibayashi | ....... | H02K 1/27 |
| | | | | 310/75 R |
| 2015/0035389 A1* | 2/2015 | Lee | ................. | H02K 19/103 |
| | | | | 310/46 |
| 2015/0288233 A1* | 10/2015 | Kim | ................. | H02K 1/2766 |
| | | | | 310/156.01 |
| 2017/0126087 A1* | 5/2017 | Soderberg | ............ | H02K 5/02 |
| 2018/0145575 A1* | 5/2018 | Woehl-Bruhn | .... | H02K 1/2766 |
| 2020/0228038 A1* | 7/2020 | Takahashi | .......... | H02K 1/2766 |
| 2021/0218299 A1* | 7/2021 | Mikami | ............ | H02K 1/276 |

FOREIGN PATENT DOCUMENTS

| | | |
|---|---|---|
| EP | 3447888 A1 | 2/2019 |
| JP | 2006136088 A | 5/2006 |
| JP | 2020010486 A | 1/2020 |

\* cited by examiner

PERMANENT MAGNET MOTOR WITH FIELD WEAKENING ARRANGEMENT

CROSS-REFERENCE TO RELATED APPLICATIONS

This application claims priority to EP patent application no. 20176838.9 filed 27 May 2020, entitled "PERMANENT MAGNET MOTOR WITH FIELD WEAKENING ARRANGEMENT." The entirety of the aforementioned application is hereby incorporated herein by reference.

TECHNICAL FIELD

The present invention relates to a permanent magnet motor, as well as a rotor for a permanent magnet motor and a field weakening mechanical arrangement for such a rotor.

BACKGROUND ART

In permanent magnet motors, in particular permanent magnet synchronous motors, the speed of the motor can be increased by a technique, called field weakening. When the field of the motor is weakened, the back-emf reduces, so a larger current flows through the armature winding and this increases the speed of the motor. In other words, field weakening extends the operation range of the motor into a constant power-flux weakening regime. Consequently, the drive torque-speed operating range of the motor is increased. In general, field weakening is carried out by using stator current components to counter the fixed amplitude magnetic airgap flux generated by the rotor magnets.

However, using currents for field weakening leads to losses in the iron. Consequently, stator copper losses and iron losses reduce the output power of the motor.

SUMMARY

There may therefore be a need to provide a permanent magnet motor with improved field weakening capabilities.

The object of the present invention is solved by the subject-matter of the appended independent claims, wherein further embodiments are incorporated in the dependent claims.

According to a first aspect, there is provided a permanent magnet motor, comprising a stator, configured for generating a time-varying magnetic field, and a rotor, being arranged inside of the stator, comprises at least one permanent magnet that provides a constant magnetic field. The permanent magnet is made of a flexible material. The stator is configured for rotating the rotor by taking along the constant magnetic field of the rotor with the time-varying magnetic field of the stator. The rotor comprises a field weakening mechanical arrangement configured for weakening a flux of the permanent magnet motor. The field weakening mechanical arrangement supporting the permanent magnet and comprising a recess, configured for allowing the permanent magnet to be deformed by a centrifugal force provided by the rotation of the rotor.

Supporting the deformable permanent magnet in a field weakening mechanical arrangement, which allows the permanent magnet to be deformed in a predetermined space and form, or in other words the predetermined recess, the permanent magnet can be deformed by the centrifugal force of the rotation of the rotor in a 3D-motion. This allows a more precise tailoring of the field weakening for the motor, leading to an improved rotational speed, as well as decreased electromagnetic losses The term "the permanent magnet to be deformed", as used herein, relates to a property of the permanent magnet that allows the permanent magnet to change its shape. In other words, an external force, preferably the centrifugal force, causes the change of the shape of the permanent magnet.

Preferably, the field weakening mechanical arrangement is configured for allowing the permanent magnet to be deformed based on a magnitude of the centrifugal force provided by the rotation of the rotor.

Preferably, the rotor is disposed radially inside of the stator.

In general, a volumetric temperature distribution in the motor is not homogenous. Namely, as the convection cooled end windings in a permanent magnet synchronous motor is warmer than conduction cooled mid axial section of the stator, the magnets in the rotor will also be warmer at the end regions. Hence, the permanent magnets will endure different temperatures depending on their axial position. Therefore, they will induce different magnetic fluxes depending on their axial position in the rotor. By deforming the permanent magnets, more field weakening at a desired axial section of the rotor is provided.

With an increasing rotational speed of the rotor, the centrifugal force working on the at least one permanent magnet in the centrifugal force direction also increases. Consequently, with an increasing rotational speed of the rotor, the deformable permanent magnet tries to deform in the centrifugal force direction. The recess of the field weakening mechanical arrangement allows the permanent magnet a tailored deformation based on the centrifugal force.

Preferably, the permanent magnet motor is a permanent magnet synchronous motor. However, an extension of the invention to other electric motor types is possible.

Preferably, the change of shape of the permanent magnet is directed in a centrifugal force direction. Further preferably, the change of shape of the permanent magnet is allowed in a direction that leads to a highest motor efficiency through field weakening.

Preferably, the permanent magnet, in particular the deformation of the permanent magnet, is passively controlled. In other words, at least one permanent magnet is aligned itself, in particular its poles, in an advantageous fashion due to the centrifugal force provided by the rotation of the rotor.

Consequently, a field weakening current is not necessary, avoiding the loss effects of the field weakening current.

Furthermore, the field weakening arrangement is tailored to the properties of the motor. In particular, a shape of the recess is predetermined, or in other words tailored, to the properties of the motor. Subsequently, the permanent magnet automatically positions itself due to the centrifugal force of the rotation of the motor. Consequently, a complex actuator based active control of the field weakening arrangement can be omitted.

The shape of the recess and thus the field weakening arrangement is configured for allowing the permanent magnet a predetermined degree of freedom for deformation. Dependent on the application, or in other words the properties of the motor, the recess allows the permanent magnet to be only partially deformable.

Preferably, the deformation of the permanent magnet being a torsion in a torsional direction.

For example, the field weakening mechanical arrangement is configured for allowing only a mid section of the permanent magnet to be deformed by the centrifugal force in the centrifugal force direction.

For example, the field weakening mechanical arrangement is configured for only at least one end section of the permanent magnet to be deformed by the centrifugal force.

The flexible material, the permanent magnet is made of preferably comprises Aluminum and Ferrite. Aluminum has a Youngs' Modulus of 69 and Ferrite has a Young's Modulus of 4-5.5. Thus, a permanent magnet that allows for relatively small shape changes in three dimensions can be designed. Dependent on the application, different material compounds or alloys with different Youngs' Modulus may be designed, in particular based on the expected rotational speed of the rotor and the needed flexibility of the permanent magnet.

Consequently, the field weakening mechanical arrangement allows a mechanical field weakening effect, or in other words field weakening feature, easily being tailored for the motor.

During the operation of the motor, the permanent magnet automatically deforms based on the applied centrifugal force, wherein no complex active control is necessary.

Thus, an improved permanent magnet motor with a field weakening arrangement is provided.

In a preferred embodiment, a shape of the recess of the permanent magnet is dependent on desired field weakening properties of the field weakening mechanical arrangement.

Preferably, the shape of the recess confining the permanent magnet is predetermined when manufacturing the field weakening mechanical arrangement.

Preferably, a control logic may be added to take into account aging and fouling of the electric motor in use. Further preferably, servicing to update needed field weakening per individual application by changing recess contours may be included.

The desired field weakening properties describe how much the field of the motor is desired to be weakened depending on the rotational speed of the rotor. Based on the desired field weakening properties of the field weakening mechanical arrangement, the field weakening mechanical arrangement is designed, or in other words tailored.

Consequently, the shape of the recess is configured accordingly to allow the permanent magnet a deformation, in particular in the centrifugal force direction, which is the direction, the centrifugal force works when the rotor is rotating. The shape of the recess preferably defines a type of deformation, the permanent magnet is allowed to do, for example a torsion around an axis of the permanent magnet or bending the permanent magnet, to tune the magnet pole vector orientation. The shape of the recess preferably is configured to allow only parts of the permanent magnet to deform.

Consequently, the field weakening mechanical arrangement allows a mechanical field weakening effect, for the motor easily being tailored to the motor.

Thus, an improved permanent magnet motor with a field weakening arrangement is provided.

In a preferred embodiment, a flexibility of the permanent magnet is dependent on desired field weakening properties of the field weakening mechanical arrangement.

Preferably, the flexibility of the permanent magnet is predetermined when manufacturing the permanent magnet.

In addition, the flexibility of the permanent magnet is determined by the type of material used to manufacture the permanent magnet. The more flexible the permanent magnet is, the earlier the permanent magnet will deform, when a centrifugal force is applied to the permanent magnet.

Consequently, the field weakening mechanical arrangement allows a mechanical field weakening effect, for the motor easily being tailored to the motor.

Thus, an improved permanent magnet motor with a field weakening arrangement is provided.

In a preferred embodiment, the field weakening properties of the field weakening arrangement are dependent on an expected motor temperature and/or an expected rotational speed of the motor.

The expected motor temperature preferably comprises an expected temperature of the rotor and further comprises an expected temperature of the permanent magnet during operation of the motor.

The expected rotational speed of the motor comprises a range of rotational speed of the motor during operation, in particular a maximum rotational speed of the motor.

Consequently, the field weakening mechanical arrangement allows a mechanical field weakening effect, for the motor easily being tailored to the motor.

Thus, an improved permanent magnet motor with a field weakening arrangement is provided.

In a preferred embodiment, the permanent magnet comprises a plurality of permanent magnet units surrounded by a flexible coating layer.

In other words, the permanent magnet units and the flexible coating layer define a permanent magnet doped in a flexible compound material.

The permanent magnet units preferably are a plurality of permanent magnets, smaller than the overall permanent magnet with a prescribed collective pole vector. Together with the flexible coating layer, the permanent magnet units preferably constitute the integral permanent magnet.

In other words, the plurality of permanent magnet units is embedded within the flexible coating layer.

The permanent magnet preferably, comprises a flexible portion, in particular the flexible coating layer, and a non flexible portion, in particular the permanent magnet units.

The coating layer preferably is made of a flexible non-magnetic material, like rubber, an inflatable cushion or a memory alloy, which chances its shape at a pre-set temperature. Embedding the permanent magnet units, which are made of a magnet material, in a flexible coating layer allows the permanent magnet units to be non-flexible. Thus, even when using a non-flexible magnetic material for the permanent magnet, the flexible coating layer still provides the necessary flexibility of the permanent magnet.

Consequently, if the centrifugal force is applied to the permanent magnet, the flexible coating layer deforms into the recess of the field weakening mechanical arrangement, taking with it the non-flexible permanent magnet units. Thus, the non-flexible permanent magnet units change their position within the field weakening mechanical arrangement based on the centrifugal force applied to the permanent magnet.

Alternatively, the permanent magnet units are also made of a flexible material, preferably of a material less flexible than the material of the coating layer.

Consequently, a flexible permanent magnet is provided, wherein the magnetic portion is still made of a non-flexible material.

Thus, an improved permanent magnet motor with a field weakening arrangement is provided.

In a preferred embodiment, the permanent magnet comprises a plurality of permanent magnet units, a first flexible support layer and a second flexible support layer, wherein the plurality of permanent magnet units are distributed between the first flexible support layer and the second flexible support layer.

Similar to the embodiment above, the permanent magnet comprises a flexible portion and a non-flexible portion. The flexible portion comprises the first flexible support layer and the second flexible support layer. The permanent magnet units are sandwiched between the first flexible support layer and the second flexible support layer.

The first flexible support layer and the second flexible support layer are preferably made of a flexible non-magnetic material, like rubber or an inflatable cushion.

When no centrifugal force is applied to the permanent magnet, the first flexible support layer and second flexible support layer are disposed parallel to each other.

Such a design is easy to manufacture and has low service costs. The thickness of the first flexible support layer and the second flexible support layer allows a tailored protection of the permanent magnet units from heat exposure.

Consequently, a flexible permanent magnet is provided, wherein the magnetic portion is still made of a non-flexible material.

Thus, an improved permanent magnet motor with a field weakening arrangement is provided.

In a preferred embodiment, the at least one permanent magnet comprises a length direction along a length of the at least one permanent magnet and a width direction along a width of the at least one permanent magnet; and
the deformation of the permanent magnet being a torsion around the length direction of the permanent magnet.

Preferably, the length of the permanent magnet is defined by a longer side of the permanent magnet, wherein the width of the permanent magnet is defined by a shorter side of the permanent magnet.

The deformation in form of a torsion allows distributing the field weakening effect more uniformly in the geometry of the motor, in particular in view of a simple being of the ends of the permanent magnet.

In a preferred embodiment, the at least one permanent magnet is arranged inside the rotor.

Integrating the at least one permanent magnet inside the rotor provides a higher flux weakening capability of the motor.

Thus, an improved permanent magnet motor with a field weakening arrangement is provided.

In a preferred embodiment, the field weakening mechanical arrangement is configured for allowing the permanent magnet to change a position of the permanent magnet by the centrifugal force provided by the rotation of the rotor.

Preferably, the field weakening arrangement is configured for allowing the permanent magnet to change the position of the permanent magnet based on a magnitude of the centrifugal force provided by the rotation of the rotor.

In a preferred embodiment, the at least one permanent magnet comprises a length direction along a length of the at least one permanent magnet and a width direction along a width of the at least one permanent magnet; and the mechanical arrangement being configured for allowing the at least one permanent magnet a rotational motion around an end of the at least one permanent magnet in the length direction.

Preferably, the mechanical arrangement is configured for allowing the at least one permanent magnet a motion along the length direction of the at least one permanent magnet.

Thus, an improved permanent magnet motor with a field weakening arrangement is provided.

In a preferred embodiment, the field weakening mechanical arrangement comprises a rail arrangement for guiding the at least one permanent magnet within the field weakening mechanical arrangement.

Preferably, the rail arrangement defines a possible movement path of the permanent magnet within the field weakening mechanical arrangement. This applies to a movement of the permanent magnet as well as a deformation of the permanent magnet.

Designed allowing different movement for ends of the flexible magnet element compared to its middle, the field weakening can advantageously be distributed in the motor, as dictated by temperature gradients.

Thus, an improved permanent magnet motor with a field weakening arrangement is provided.

In a preferred embodiment, the field weakening mechanical arrangement comprises a positioning arrangement for positioning the at least one permanent magnet in a desired position.

Preferably, the positioning arrangement comprises an inflatable cushion, being controlled by a gas bladder, or a damping system for allowing a motion path for the permanent magnet.

Preferably, the positioning arrangement comprises a return arrangement for returning the permanent magnet in its original position for lower RPM. Preferably, the return arrangement comprises a spring arrangement. The spring arrangement is preferably disposed at a middle portion of the permanent magnet. Additional springs with different stiffness can be distributed along the magnet for a 3D flexure.

Preferably, the positioning of the permanent magnet is overridden by the centrifugal force at a certain rotational speed of the rotor. For example, if the positioning arrangement is an inflatable cushion, the positioning effect of the cushion will be overridden if the centrifugal force exceeds a magnitude of a positioning force that positions the permanent magnet due to the positioning arrangement. Several cushions would allow for a flexing motion.

Thus, an improved permanent magnet motor with a field weakening arrangement is provided.

In a preferred embodiment, a characteristics of the positioning arrangement is predetermined dependent on an application temperature and/or a rotational speed of the motor.

Similar to the flexibility of the permanent magnet or the shape of the recess, the characteristics of the positioning arrangement, for example a spring force or the spring arrangement, is tailored to the application of the motor.

These and other aspects of the present invention will become apparent from and elucidated with reference to the embodiments described hereinafter.

According to an aspect of the invention, a rotor for a permanent magnet motor, as described herein, is provided.

Preferably, the rotor, which is arranged inside of a stator, comprises at least one permanent magnet that provides a constant magnetic field, the permanent magnet being made of a flexible material. The rotor preferably comprises a field weakening mechanical arrangement configured for weakening a flux of the permanent magnet motor. The field weakening mechanical arrangement supports the permanent magnet and is configured for allowing the permanent magnet to be deformed by the centrifugal force provided by the rotation of the rotor.

According to an aspect of the invention, a field weakening mechanical arrangement for a rotor, as described herein, is provided.

Preferably, the field weakening mechanical arrangement is disposed in a rotor of a permanent magnet motor and supports a permanent magnet and is configured for allowing the permanent magnet to be deformed by a magnitude of centrifugal force provided by the rotation of the rotor.

BRIEF DESCRIPTION OF DRAWINGS

Exemplary embodiments of the invention will be described in the following with reference to the following drawings.

The figures are merely schematic representations and serve only to illustrate embodiments of the invention. Identical or equivalent elements are in principle provided with the same reference signs.

DESCRIPTION OF EMBODIMENTS

Figure 1:
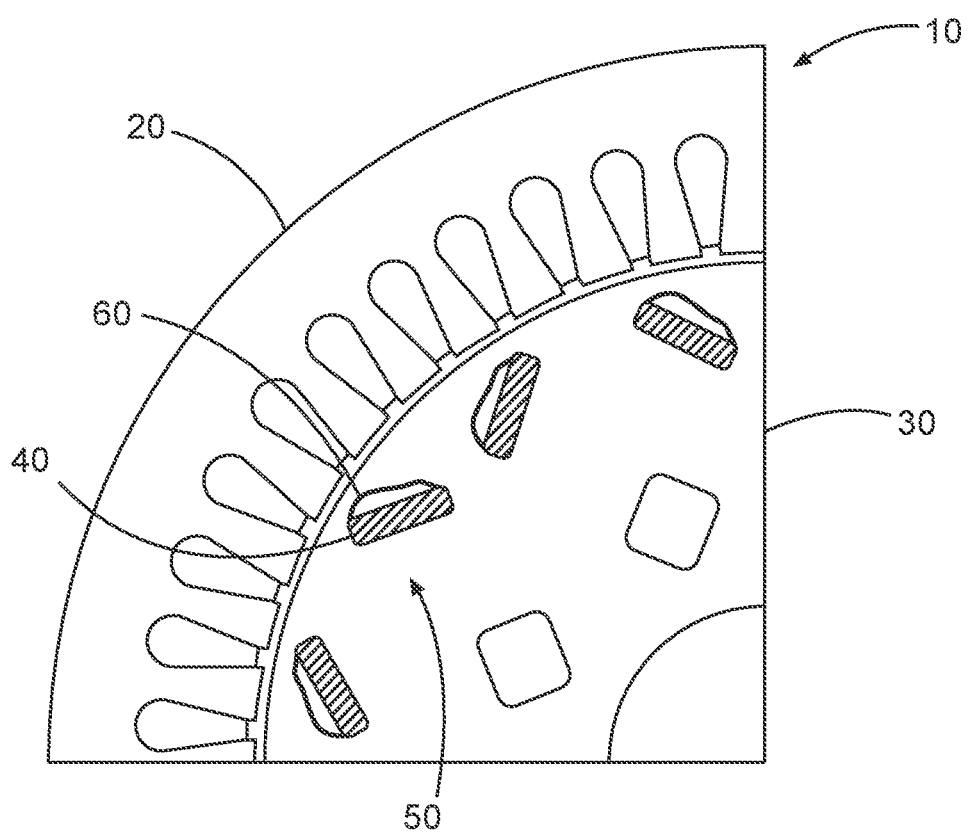
FIG. 1 shows a schematic view of a permanent magnet motor according to a first embodiment.

FIG. 1 shows a schematic view of a permanent magnet motor 10, in this case a permanent magnet synchronous motor, according to a first embodiment. The permanent magnet motor 10 comprises a stator 20 and a rotor 30. The stator 20 is configured for generating a time-varying magnetic field, in particular by using at least one electromagnet. The stator 20 has a circular shape. The rotor 30 also has a circular shape and is disposed radially inside of the stator 20. The rotor 30 comprises at least one, in this case a plurality of, permanent magnets 40. The permanent magnets 40 are providing a constant magnetic field. The electromagnets of the stator 20 are operated in such a way that the rotor 30 is rotated within the stator 20. In other words, the time-varying magnetic field of the electromagnets of the stator 20 carry along the constant magnetic field of the permanent magnets of the rotor 20. In order to improve the speed of the rotor 30, field weakening features are used. In this case, the permanent magnets 40 are embedded within the rotor 30. The rotor 30 comprises a field weakening arrangement 50 supporting the at least one permanent magnet 40. In other words, each permanent magnet 40 is supported by one field weakening arrangement 50. The field weakening arrangement 50, in its most basic form, is formed by a cavity in the rotor 30. The cavity however is of a larger volume than the volume of the permanent magnet 40. Thus, a recess 60 remains that is not occupied by the permanent magnet 40, when the motor stands still.

The permanent magnets 40 are made of a flexible material, for example an aluminum ferrite alloy. Thus, when the rotor 30 is rotating, a centrifugal force is spontaneously imposed on to the permanent magnets 40 in a centrifugal force direction, or in other words, a radially outwards direction. The recesses 60 of the field weakening arrangements 50 are disposed in such a way, that the permanent magnets 40 are deformed in the centrifugal force direction by the centrifugal force. Thus, at least parts of the permanent magnets 40 are moved radially outwards, dependent on the rotational speed of the rotor 30. This leads to a field weakening effect. Consequently, the rotation of the rotor 30 automatically leads to the field weakening effect. This mechanical solution avoids the known current induced solutions, which introduce iron losses. Thus, by tailoring the flexibility of the permanent magnets and a shape of the recess of the field weakening arrangement to the application of the motor 10, in particular to an expected temperature and an expected rotational speed, field weakening can mechanically be achieved in a simple manner.

Figure 2A:
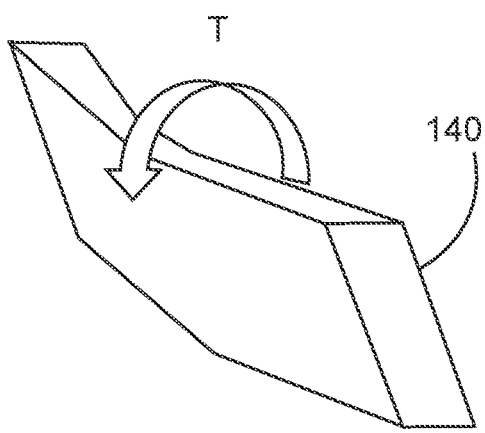
FIG. 2a shows a schematic view of a deformable permanent magnet according to a first embodiment.

FIG. 2a shows a schematic view of a deformable permanent magnet 140 according to a first embodiment. The permanent magnet 140 has a generally cuboid shape. The permanent magnet 140, as shown, is deformable in a torsional direction T in a central portion of the permanent magnet 140 only. This deformation of only a central portion of the permanent magnet 140 is either achieved by the composition of flexible materials or by the space, a recess of a field weakening arrangement in the rotor provides. In other words, when the rotor is standing still, the permanent magnet 140 has a non deformed cuboid shape, while an increasing rotational speed of the rotor leads to a deformation of the permanent magnet 140 in the torsional direction T.

Figure 2B:
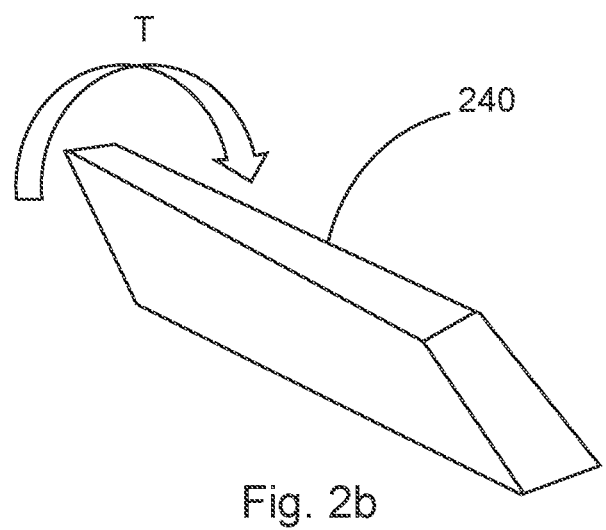
FIG. 2b shows a schematic view of a deformable permanent magnet according to a second embodiment.

FIG. 2b shows a schematic view of a deformable permanent magnet 240 according to a second embodiment. Compared to the permanent magnet 140 of FIG. 2a, the permanent magnet 240 according to the second embodiment is deformable in a torsional direction T at an end portion of the permanent magnet 240 only. The manner and amount of deformation of the permanent magnet 240 is tailored to the application of the permanent magnet motor, the permanent magnet 240 is used in.

Figure 3A:
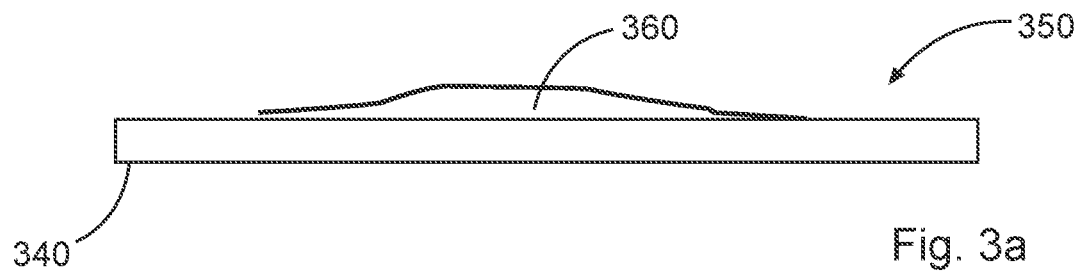
FIG. 3a shows a schematic view of a field weakening arrangement according to a first embodiment.

FIG. 3a shows a schematic view of a field weakening arrangement 350 according to a first embodiment. The field weakening arrangement 350 comprises a permanent magnet 340 and a recess 360. The permanent magnet 340 is completely made of a magnetic and flexible material. Thus, due to a centrifugal force applied to the permanent magnet 340, the permanent magnet 340 deforms into the recess 360 in a centrifugal force direction.

Figure 3B:
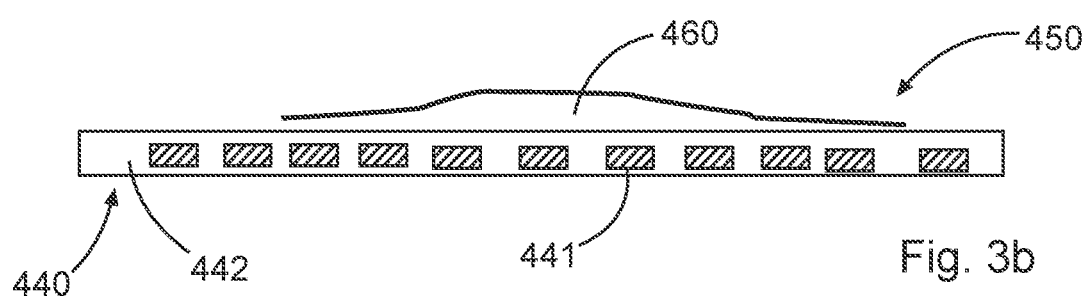
FIG. 3b shows a schematic view of a field weakening arrangement according to a second embodiment.

FIG. 3b shows a schematic view of a field weakening arrangement 450 according to a second embodiment. The field weakening arrangement 450 of the second embodiment comprises a permanent magnet 440 and a recess 460. The permanent magnet 440 comprises a plurality of permanent magnet units 441 and a coating layer 442. The coating layer 442 is embedding the permanent magnet unit 441. The permanent magnet units 441 are made of a non-flexible magnetic material. In other words, the permanent magnet units 441 are permanent magnets, which are smaller than the permanent magnet 440. The permanent magnet units 441 are preferably arranged distant to each other in a line along the permanent magnet 440. The coating layer 442 is made of a flexible material. Although the coating layer 442 is generally made of a non-magnetic flexible material like rubber or an inflatable cushion, the coating layer 442 may also be made of a magnetic flexible material as long as the material fulfills the flexibility requirements of the specific application. When a centrifugal force is applied to the permanent magnet 440, the coating layer 442 is deformed into the recess 460 and carries the embedded permanent magnet units 441 with it, providing the field weakening feature.

Figure 3C:
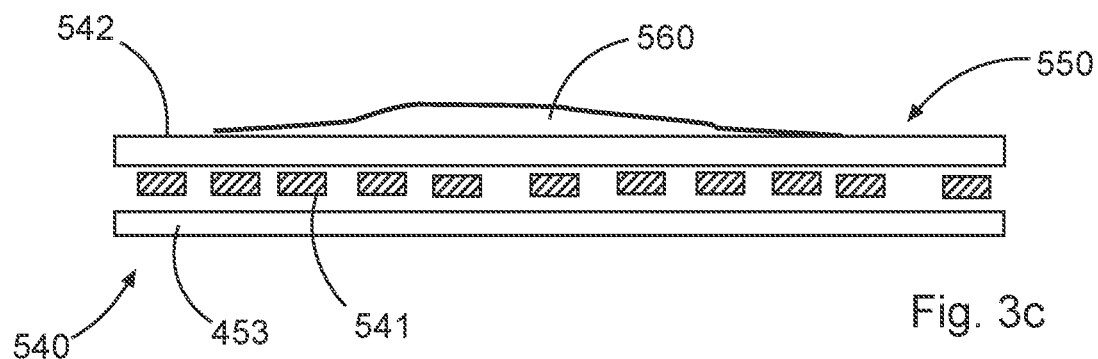
FIG. 3c shows a schematic view of a field weakening arrangement according to a third embodiment.

FIG. 3c shows a schematic view of a field weakening arrangement 550 according to a third embodiment. The field weakening arrangement 550 according to the third embodiment comprises a permanent magnet 540 and a recess 560. The permanent magnet 540 comprises a plurality of permanent magnet units 541 and a first support layer 542 and a second support layer 543. The first support layer 542 and the second support layer 543 are disposed parallel to each other. The plurality of permanent magnet units 541 are disposed between the first support layer 542 and the second support layer 543. The permanent magnet units 541 are made of a non-flexible magnetic material. The first support layer 542 and the second support layer 543 are made of a flexible non-magnetic material.

Figure 3D:
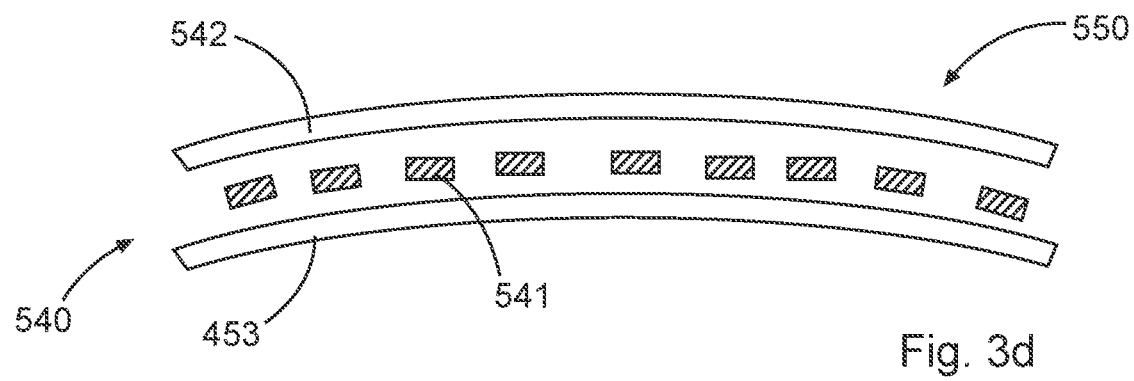
FIG. 3d shows a schematic view of a field weakening arrangement according to a fourth embodiment.

FIG. 3d shows a schematic view of the field weakening arrangement 550 of the third embodiment, when a centrifugal force is applied. When the centrifugal force is applied to the permanent magnet 540, the first support layer 542 and the second support layer 543 are deformed into the recess 560 and carry the embedded permanent magnet units 541 with it, providing the field weakening feature.

Figure 4:
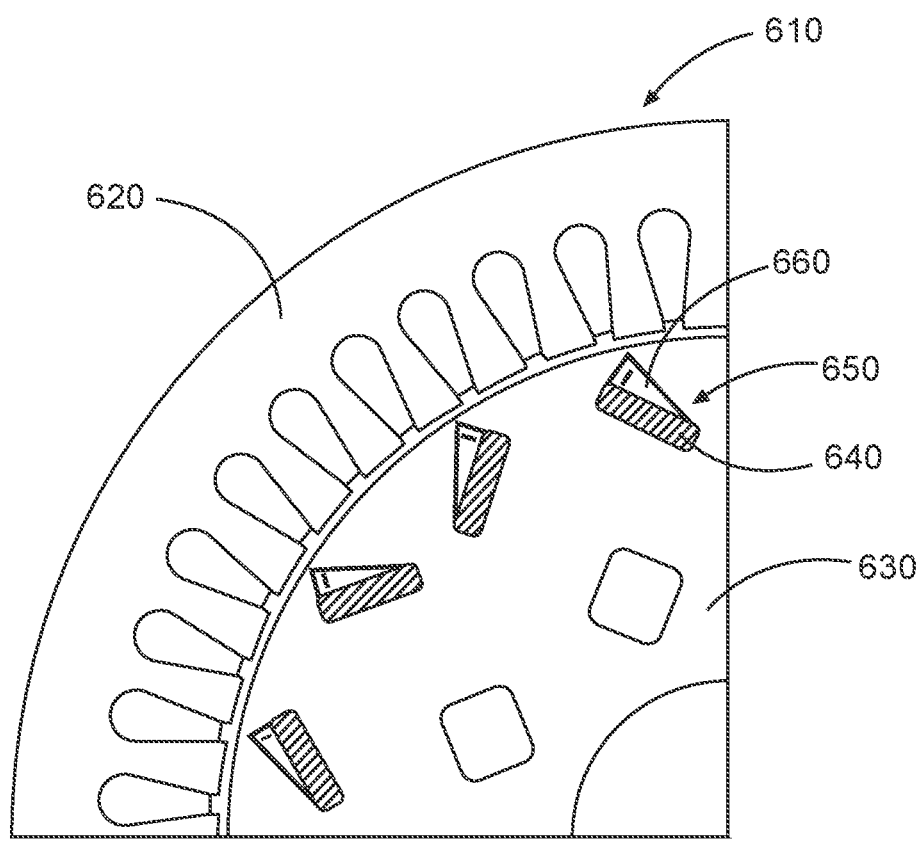
FIG. 4 shows a schematic view of a permanent magnet motor according to a second embodiment.

FIG. 4 shows a schematic view of a permanent magnet motor 610 according to a second embodiment. The permanent magnet motor 610 of the second embodiment similar to the permanent magnet motor 10 of the first embodiment comprises a stator 620 and a rotor 630. The rotor 630 comprises a plurality of permanent magnets 640, each supported by a field weakening arrangement 650. In addition to the deformation of the permanent magnets 640, the field weakening arrangement 650 provides a possible movement of permanent magnets 640 further described in the following figures.

Figure 5A:
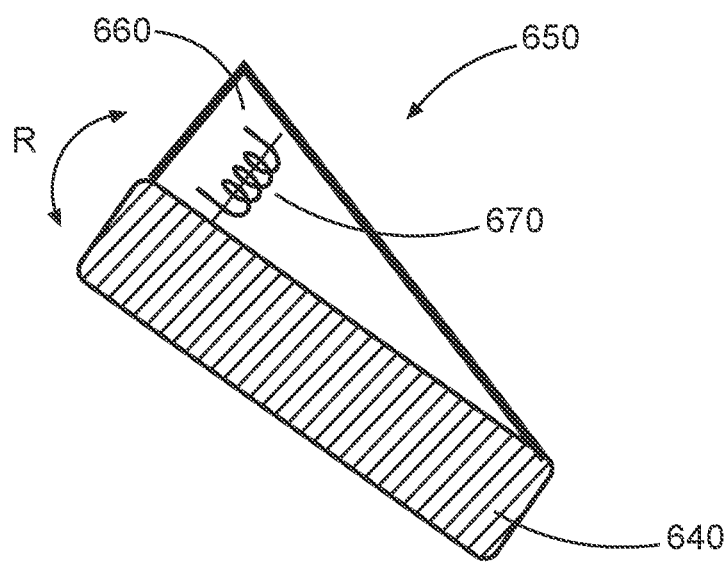
FIG. 5a shows a schematic view of a field weakening arrangement according to a fifth embodiment.

FIG. 5a shows a schematic view of a field weakening arrangement 650 according to a fifth embodiment. The field weakening arrangement 650 of the fifth embodiment comprises a permanent magnet 640 and a recess 660. Further, the field weakening arrangement 650 comprises a positioning arrangement in form of a spring 670. The spring 670 holds the permanent magnet 640 in place. When a centrifugal force is applied to the permanent magnet 640, the permanent magnet 640 is moved along a movement direction R into the recess 660 against the force of the spring 670. The movement direction R in this case is a pivot direction. Thus, the spring 670 returns the permanent magnet 640 back into its original position, when not more centrifugal force is present. Also, the spring 670 can be tailored to the specifics of the application of the motor. In other words, stiffness of the spring 670 can be tailored to the application of the motor.

Figure 5B:
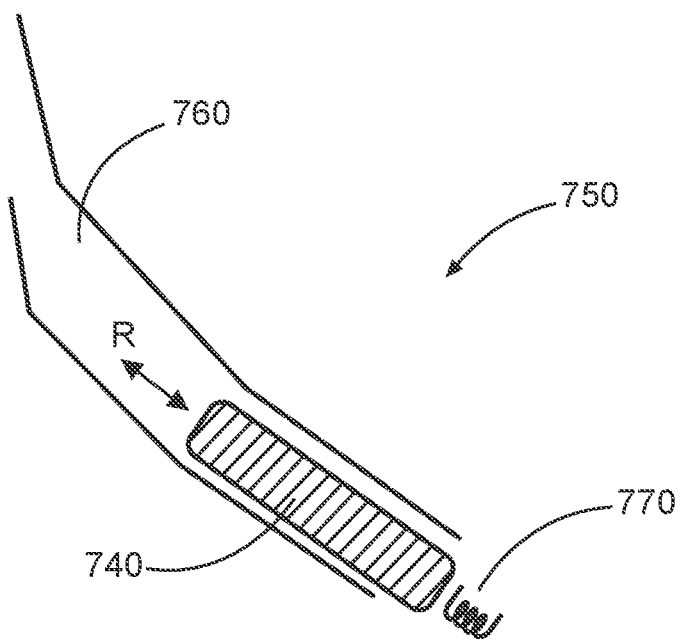
FIG. 5b shows a schematic view of a field weakening arrangement according to a sixth embodiment.

FIG. 5b shows a schematic view of a field weakening arrangement 750 according to a sixth embodiment. The field weakening arrangement 750 of the sixth embodiment comprises a permanent magnet 740 and a recess 760. Further, the field weakening arrangement 750 comprises a positioning arrangement in form of a spring 770. Compared to the embodiment described above, the recess 760 is formed along a length direction of the permanent magnet 740. Consequently, a movement direction R also is along the length direction of the permanent magnet.

Figure 5C:
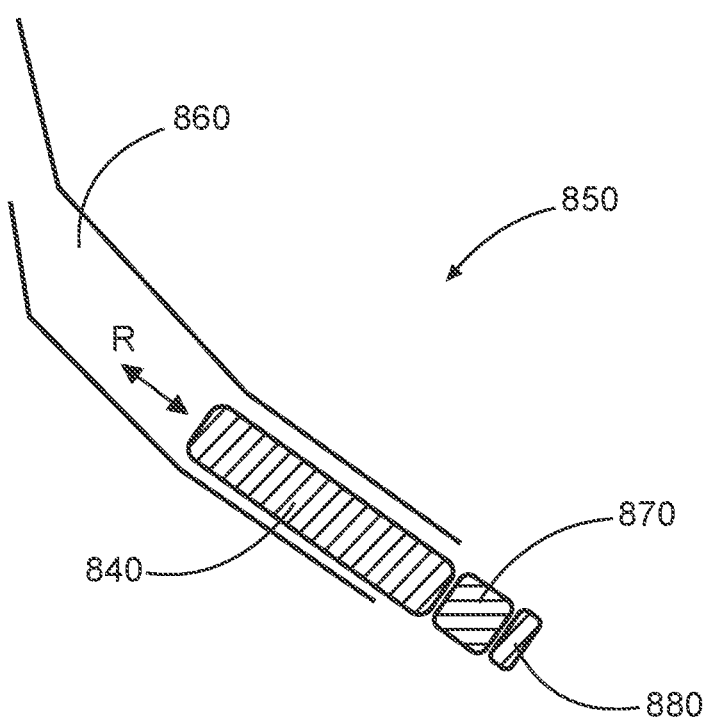
FIG. 5c shows a schematic view of a field weakening arrangement according to a seventh embodiment.

FIG. 5c shows a schematic view of a field weakening arrangement 850 according to a seventh embodiment. The field weakening arrangement 850 of the seventh embodiment comprises a permanent magnet 840 and a recess 860. Further, the field weakening arrangement 850 comprises a positioning arrangement in form of an inflatable cushion supplied by a gas bladder 880. Compared to the embodiment described above, the type of positioning arrangement has changed. The inflatable cushion 870 with the gas bladder 880 provides similar mechanical features as the spring 770.

Other variations to the disclosed embodiments can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

LIST OF REFERENCE SIGNS 10 permanent magnet motor
20 stator
30 rotor
40 permanent magnet
50 field weakening arrangement
60 recess
T torsional direction
140 permanent magnet
240 permanent magnet
340 permanent magnet
350 field weakening arrangement
360 recess
440 permanent magnet
441 permanent magnet units
442 coating layer
450 field weakening arrangement
460 recess
540 permanent magnet
541 permanent magnet units
542 first support layer
543 second support layer
550 field weakening arrangement
560 recess
610 permanent magnet motor
620 stator
630 rotor
640 permanent magnet
650 field weakening arrangement
660 recess
670 spring (positioning arrangement)
R movement direction
740 permanent magnet
750 field weakening arrangement
760 recess
770 spring (positioning arrangement)
840 permanent magnet
850 field weakening arrangement
860 recess
870 inflatable cushion (positioning arrangement)
880 gas bladder

The invention claimed is:

1. A permanent magnet motor, comprising:
    a stator configured for generating a time-varying magnetic field; and
    a rotor arranged inside of the stator, comprising a permanent magnet unit providing a constant magnetic field;
    wherein the permanent magnet unit is made of a flexible material,
    wherein the stator is configured for rotating the rotor by taking along the constant magnetic field of the rotor with the time-varying magnetic field of the stator, and
    wherein the rotor comprises a field weakening mechanical arrangement configured for weakening a flux of the permanent magnet motor, and the field weakening mechanical arrangement supports the permanent magnet unit, and the rotor further comprises a recess configured for allowing only a portion of the permanent magnet unit to be deformed into the recess by a centrifugal force provided by the rotation of the rotor.

2. The permanent magnet motor of claim 1, wherein a shape of the recess is dependent on defined field weakening properties of the field weakening mechanical arrangement.

3. The permanent magnet motor of claim 2, wherein the defined field weakening properties of the field weakening arrangement are dependent on a temperature associated with an application of the permanent magnet motor.

4. The permanent magnet motor of claim 2, wherein the defined field weakening properties of the field weakening arrangement are dependent on a rotational speed of the permanent magnet motor.

5. The permanent magnet motor of claim 1, wherein a flexibility of the permanent magnet unit is dependent on defined field weakening properties of the field weakening mechanical arrangement.

6. The permanent magnet motor of claim 1, further comprising a flexible coating layer covering a group of permanent magnet units comprising the permanent magnet unit.

7. The permanent magnet motor of claim 1, further comprising a first flexible support layer and a second flexible support layer, and a group of permanent magnet units disposed between the first flexible support layer and the second flexible support layer, wherein the group of permanent magnet units comprise the permanent magnet unit.

8. The permanent magnet motor of claim 1, wherein the permanent magnet unit comprises a length direction along a length of the permanent magnet unit, and a width direction along a width of the permanent magnet unit, and
    the deformation of only the portion of the permanent magnet unit being a torsion around the longer direction of the permanent magnet unit.

9. The permanent magnet motor of claim 1, wherein the permanent magnet unit is arranged inside the rotor.

10. The permanent magnet motor of claim 1, wherein a shape of the recess is configured for allowing the permanent magnet unit to change a position of the permanent magnet unit by the centrifugal force provided by the rotation of the rotor.

11. The permanent magnet motor of claim 10, wherein the permanent magnet unit comprising a longer direction along a length of the permanent magnet unit, and a shorter direction along a width of the permanent magnet unit, and the recess is configured for allowing the deformation of only the portion of the permanent magnet unit being a rotational motion around an end portion of the permanent magnet unit in the length direction.

12. The permanent magnet motor of claim 1, wherein the field weakening mechanical arrangement comprises a rail arrangement for guiding the permanent magnet unit within the field weakening mechanical arrangement.

13. The permanent magnet motor of claim 1, wherein the field weakening mechanical arrangement comprising a positioning arrangement for positioning the permanent magnet unit in a desired position.

14. The permanent magnet motor of claim 13, wherein a characteristic of the positioning arrangement is determined dependent on a temperature associated with an application of the permanent magnet motor.

15. The permanent magnet motor of claim 13, wherein a characteristic of the positioning arrangement is determined dependent on a rotational speed of the permanent magnet motor.

16. A rotor for a permanent magnet motor, the rotor comprising:
    a permanent magnet unit providing a constant magnetic field, wherein the permanent magnet unit is made of a flexible material; and
    a field weakening mechanical arrangement configured for weakening a flux of the permanent magnet motor, wherein the field weakening mechanical arrangement supports the permanent magnet unit, and comprises a recess configured for allowing only a portion of the permanent magnet unit to be deformed into the recess by a centrifugal force provided by the rotation of the rotor, wherein the rotor is arranged inside of a stator configured for generating a time-varying magnetic field, and wherein the stator is configured for rotating the rotor by taking along the constant magnetic field of the rotor with the time-varying magnetic field of the stator.

17. The rotor of claim 16, wherein a shape of the recess is dependent on defined field weakening properties of the field weakening mechanical arrangement.

18. A field weakening arrangement for a rotor, comprising:
    a recess configured for allowing only a portion of a flexible permanent magnet unit to be deformed into the recess by a centrifugal force provided by rotation of the rotor, wherein the field weakening mechanical arrangement is configured for weakening a flux of the permanent magnet unit, and supports the flexible permanent magnet unit providing a constant magnetic field.

19. The field weakening arrangement for the rotor of claim 18, wherein the flexible permanent magnet unit is made of a flexible material.

20. The field weakening arrangement for the rotor of claim 18, wherein a shape of the recess is dependent on defined field weakening properties of the field weakening mechanical arrangement.

* * * * *